US009462749B1

(12) United States Patent
Jens et al.

(10) Patent No.: US 9,462,749 B1
(45) Date of Patent: Oct. 11, 2016

(54) SELECTIVELY HARVESTING FRUITS (71) Applicant: Harvest Moon Automation Inc., Winchester, MA (US)

(72) Inventors: Stephen Jens, Winchester, MA (US); Janice Huxley Jens, Winchester, MA (US); Edward Dickinson, Leicester, MA (US)

(73) Assignee: Harvest Moon Automation Inc., Winchester, MA (US)

( * ) Notice: Subject to any disclaimer, the term of this patent is extended or adjusted under 35 U.S.C. 154(b) by 0 days.

(21) Appl. No.: 14/696,037

(22) Filed: Apr. 24, 2015

(51) Int. Cl.
| G06K 9/00 | (2006.01) |
| A01D 46/30 | (2006.01) |
| G06T 7/00 | (2006.01) |
| G06T 7/40 | (2006.01) |
| G06K 9/46 | (2006.01) |

(52) U.S. Cl.
CPC ........... *A01D 46/30* (2013.01); *G06K 9/00536* (2013.01); *G06K 9/4652* (2013.01); *G06T 7/0004* (2013.01); *G06T 7/408* (2013.01); *G06T 2207/30128* (2013.01)

(58) Field of Classification Search
None
See application file for complete search history.

(56) References Cited

U.S. PATENT DOCUMENTS

| 117,705 | A | 8/1871 | Warren et al. |
| 218,795 | A | 8/1879 | Thompson |
| 811,978 | A | 2/1906 | Weigen |
| 2,544,023 | A | 3/1951 | Johnson |
| 2,583,571 | A | 1/1952 | Howe |
| 2,825,273 | A | 3/1958 | Faucheux |
| 4,519,193 | A | * | 5/1985 | Yoshida | ................. | A01D 46/24 348/89 |

(Continued)

FOREIGN PATENT DOCUMENTS

| EP | 267860 A3 | 4/1990 |
| EP | 1002460 B1 | 4/2003 |

(Continued)

OTHER PUBLICATIONS

Authorized Officer E. Eskina, International Search and Written Opinion for International Application No. PCT/US2016/018859, dated May 12, 2016, 8 pages.

(Continued)

*Primary Examiner* — Shervin Nakhjavan
(74) *Attorney, Agent, or Firm* — Fish & Richardson P.C.

(57) ABSTRACT

A method of selectively harvesting fruits includes generating a first series of images of a plant while the plant is moved to expose hidden fruits, identifying an object displayed in the first series of images as a suspect fruit from feature boundary data defined by color regions, comparing a color parameter of the suspect fruit to a criterion associated with a ripeness, advancing an automated picker toward the suspect fruit based on a determined position of the suspect fruit and while monitoring a proximity sensor of the automated picker, detecting a color of the impediment and confirming that the impediment is a fruit, operating the automated picker to pick the fruit from the plant, and while the automated picker is operated to pick the fruit, generating a second series of images of one or more additional plants while the one or more additional plants are moved to expose additional fruits.

20 Claims, 6 Drawing Sheets
(2 of 6 Drawing Sheet(s) Filed in Color)

(56) References Cited

U.S. PATENT DOCUMENTS

| | | |
|---|---|---|
| 4,532,757 A | 8/1985 | Tutle |
| 4,843,561 A | 6/1989 | Larson |
| 4,873,644 A * | 10/1989 | Fujii .................. A01D 46/24 56/10.2 R |
| 4,975,016 A | 12/1990 | Pellenc et al. |
| 5,054,232 A | 10/1991 | Rhode |
| 5,544,474 A | 8/1996 | Finkelstein |
| 6,919,959 B2 | 7/2005 | Masten |
| 7,215,420 B2 | 5/2007 | Gellerman et al. |
| 7,725,233 B2 | 5/2010 | Hendrickson et al. |
| 7,765,780 B2 * | 8/2010 | Koselka .................. A01D 46/30 56/10.2 A |
| 8,272,200 B1 | 9/2012 | Ottaway |
| 8,381,501 B2 | 2/2013 | Koselka et al. |
| 8,452,501 B1 | 5/2013 | Lange et al. |
| 8,642,910 B2 | 2/2014 | Pellenc et al. |
| 8,841,570 B2 | 9/2014 | Vasilescu |
| 8,855,412 B2 | 10/2014 | Quan et al. |
| 9,282,688 B2 | 3/2016 | Casper et al. |
| 2002/0022929 A1 | 2/2002 | Ell |
| 2002/0024665 A1* | 2/2002 | Masten ............... A01M 7/0089 356/328 |
| 2008/0110026 A1 | 5/2008 | Marcoe |
| 2009/0293442 A1 | 12/2009 | Chang et al. |
| 2011/0022231 A1 | 1/2011 | Walker |
| 2011/0046785 A1 | 2/2011 | Zeelen |
| 2011/0047951 A1 | 3/2011 | Moore |
| 2011/0211733 A1 | 9/2011 | Schwarz |
| 2012/0096823 A1 | 4/2012 | Moore |
| 2013/0204437 A1 | 8/2013 | Koselka |
| 2013/0325346 A1 | 12/2013 | McPeek |
| 2014/0168412 A1 | 6/2014 | Shulman et al. |
| 2014/0260148 A1 | 9/2014 | Jens |
| 2014/0314280 A1* | 10/2014 | Lee .................. G06K 9/00697 382/110 |
| 2015/0027040 A1* | 1/2015 | Redden ............... A01M 21/046 47/1.3 |
| 2016/0078304 A1 | 3/2016 | Bremer et al. |

FOREIGN PATENT DOCUMENTS

| | | |
|---|---|---|
| JP | 03506779 B2 | 3/2004 |
| JP | 2009027977 A | 2/2009 |
| SU | 1045848 A1 | 10/1983 |
| SU | 1289412 A1 | 2/1987 |
| WO | WO9625842 A1 | 8/1996 |
| WO | WO9853961 A1 | 12/1998 |
| WO | WO2005092077 A3 | 3/2006 |
| WO | WO2007088225 A1 | 8/2007 |
| WO | WO2008037035 A1 | 4/2008 |
| WO | WO2006063314 A3 | 4/2009 |
| WO | WO2010063075 A1 | 6/2010 |
| WO | WO2011041924 A1 | 4/2011 |
| WO | WO2015121809 A1 | 8/2015 |

OTHER PUBLICATIONS

Authorized Officer Arnaud Benedetti, International Search and Written Opinion for International Application No. PCT/US2016/028631, dated Jul. 13, 2016, 13 pages.

\* cited by examiner

SELECTIVELY HARVESTING FRUITS

TECHNICAL FIELD

This invention relates to selectively harvesting plant components, and more particularly to selectively removing fruits from plants in an automated manner.

BACKGROUND

Harvesting fruits involves visually examining plants from which the fruits grow and then determining which of the fruits are satisfactory for picking (e.g., removal from the plants). Criteria for determining whether a fruit is satisfactory for picking may be based on one or more parameters including a color, a size, and ripeness. Selected fruits that are deemed satisfactory for picking may be removed using a harvesting apparatus (e.g., an automated or semi-automated harvesting machine or a hand-held apparatus) or removed directly by hand. Harvesting fruits manually or using harvesting apparatuses may be limited to favorable ambient conditions (e.g., time of day and weather), require significant amounts of time, and be associated with significant costs.

SUMMARY

The invention involves a realization that improvements in selectively harvesting fruits (e.g., strawberries) in an automated manner can increase an efficiency (e.g., a productivity as it relates to a picking rate) of a harvesting operation, thereby reducing a unit cost of harvesting a fruit. Such selective harvesting of the fruits in the automated manner can further increase a duration over which the harvesting operation can occur, thereby reducing a total time required to harvest a given amount of fruits.

One aspect of the invention features a method of selectively harvesting fruits. The method includes generating a first series of images of a plant while the plant is moved to expose hidden fruits on or within the plant, identifying an object displayed in the first series of images as a suspect fruit on or within the plant from feature boundary data defined by color regions associated with the images, and comparing a color parameter of the suspect fruit to a criterion associated with a ripeness of fruits to be harvested. In response to determining that the color parameter of the suspect fruit meets the criterion, the method further includes advancing an automated picker toward the suspect fruit based on a determined position of the suspect fruit and while monitoring a proximity sensor of the automated picker. In response to a signal from the proximity sensor indicating that the automated picker is within a predetermined distance of an impediment, the method further includes detecting a color of the impediment and confirming based on the color of the impediment that the impediment is a fruit. Upon confirming that the impediment is the fruit, the method further includes operating the automated picker to pick the fruit from the plant. The method further includes generating a second series of images of one or more additional plants while the one or more additional plants are moved to expose additional fruits on or within the one or more additional plants while the automated picker is operated to pick the fruit.

Another aspect of the invention features a harvesting system that includes a machine vision system that is configured to generate a first series images of a plant while the plant is moved to expose hidden fruits on or within the plant. The harvesting system further includes a processor that is configured to identify an object displayed in the first series of images as a suspect fruit on or within the plant from feature boundary data defined by color regions associated with the images, compare a color parameter of the suspect fruit to a criterion associated with a ripeness of fruits to be harvested, and determine that the color parameter of the suspect fruit meets the criterion. The system further includes an automated picker that is operable to pick the suspect fruit from the plant, the automated picker including a proximity sensor that is configured to indicate that the automated picker is within a predetermined distance of an impediment, and a color sensor that is configured to detect a color of the impediment. The harvesting system further includes a controller that is configured to provide instructions for advancing the automated picker toward the suspect fruit based on a determined position of the suspect fruit in response to the determination that the color parameter of the suspect fruit meets the criterion, while monitoring the proximity sensor of the automated picker, and while the machine vision system generates a second series of images of one or more additional plants while the one or more additional plants are moved to expose additional fruits on or within the one or more additional plants, and confirming that the impediment is a fruit based on the color of the impediment.

In some embodiments, the first and second series of images are generated using a machine vision system including a camera that is directed toward the plant and a processor that is operable to analyze the images.

In certain embodiments, the automated picker is located rearward of the machine vision system, such that the machine vision system generates the second series of images of the one or more additional plants while the automated picker is operated to pick the fruit.

In some embodiments, the method further includes maintaining a desired distance between the machine vision system and the plant.

In certain embodiments, the method further includes adjusting Red Green Blue data of the first and second series of images to expose fruits hidden by shadows of leaves of the plant.

In some embodiments, identifying the object as a suspect fruit includes identifying the object as a strawberry.

In certain embodiments, the method further includes identifying the object as a suspect fruit using a pattern recognition algorithm.

In some embodiments, the pattern recognition algorithm includes a blob analysis.

In certain embodiments, the blob analysis identifies regions of the object that share one or more colors and determines a border around the regions that defines a pattern of the object.

In some embodiments, identifying the object as a suspect fruit includes comparing the pattern of the object to a known pattern of the fruit.

In certain embodiments, the pattern of the object includes a shape of the object.

In some embodiments, comparing the color parameter of the fruit to the criterion includes comparing a percentage ripeness of the fruit to a ripeness threshold.

In certain embodiments, the predetermined position of the suspect fruit is a two-dimensional location.

In some embodiments, the method further includes, before advancing the automated picker toward the suspect fruit, aligning the automated picker with the two-dimensional location of the suspect fruit.

In certain embodiments, the predetermined distance is a zero distance, such that the color of the impediment is detected in response to contact with the impediment.

In some embodiments, the automated picker is a suction picker.

In certain embodiments, the automated picker is a talon picker.

In some embodiments, the method further includes moving the plant by blowing air toward the plant while the first series of images is generated.

In certain embodiments, the method further includes moving the plant by brushing the plant from side to side with a flexible comb while the first series of images is generated.

In some embodiments, the machine vision system includes a hood surrounding the camera and reducing an amount of natural light incident on the plant.

In certain embodiments, the camera generates an image every 200 ms.

In some embodiments, the percentage ripeness is calculated based on colors of pixels in the images.

In certain embodiments, blowing air toward the plant includes alternately directing pulses of air toward the plant from different directions.

In some embodiments, the method further includes controlling the automated picker to deposit the fruit atop a conveyor.

Various implementations of these concepts may provide one or more advantages, particularly as to harvesting speed and/or accuracy. For example, by continuing to generate additional images of additional plants located ahead of the automated picker while the automated picker is manipulated to remove fruits and while the plants ahead of the automated picker continue to be moved, the harvesting system can achieve an advantageously high picking rate (e.g., a strawberry picking rate). Moreover, such parallel operations can offer additional time for the image processing system to develop an accurate determination of the location and ripeness of fruits to be picked. Incorporating distance and/or color sensing into the picking mechanism can further increase the accuracy of the picking process, and can enable higher mechanism speeds without damaging sensitive fruits.

The details of one or more embodiments of the invention are set forth in the accompanying drawings and the description below. Other features, aspects, and advantages of the invention will be apparent from the description, drawings, and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference symbols in the various figures indicate like elements.

DETAILED DESCRIPTION

A harvesting system for selectively removing plant components from plants is described below. The described harvesting system includes picking systems, manipulation devices, machine vision systems, and associated control elements that allow the harvesting system to remove selected plant components from their respective plants in an automated and efficient manner, thereby substantially reducing the time required to remove the selected plant components as compared to the time required to remove the selected plant components using conventional harvesters. Plant components that may be removed by the harvesting system include, for example, vegetables and fruits, such as berries (e.g., strawberries, blueberries, raspberries, and blackberries), citrus fruits, apples, pears, and peaches.

Figure 1:
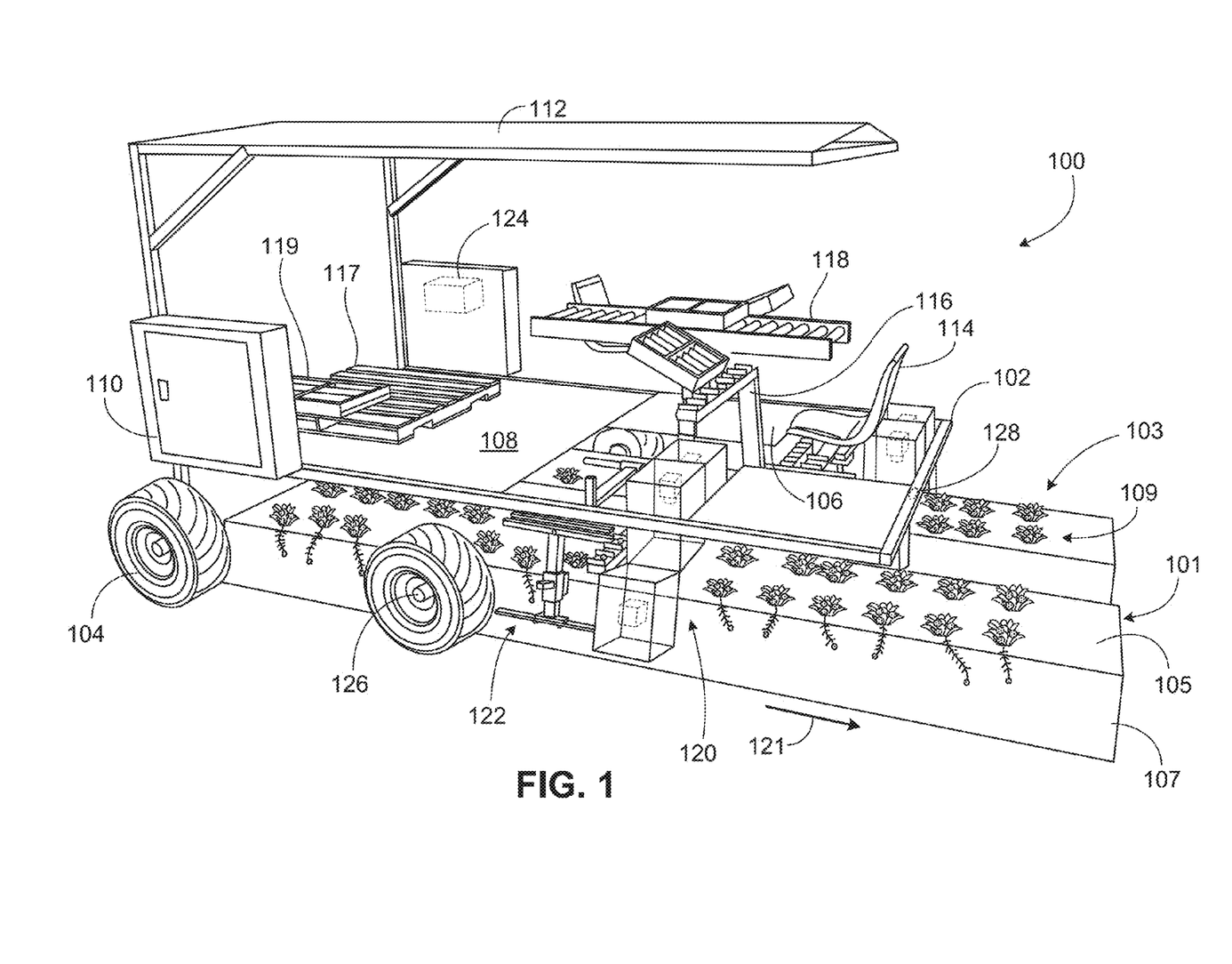
FIG. 1 is a perspective view of a harvesting system.

FIG. 1 displays a perspective view of a harvesting system 100 that is operable to selectively remove a variety of fruits (e.g., strawberries) from plants in an automated manner. In some examples, the harvesting system 100 may be self-propelled and steered by an operator (e.g., an operator riding atop the harvesting system 100 or a remote operator). In some examples, the harvesting system 100 may be configured to operate autonomously based on GPS mappings. In some examples, the harvesting system 100 may be configured to operate with other vehicles, such as a tractor that can pull and guide the harvesting system 100 through a field. In such cases, the harvesting system 100 may be attached to the tractor via a three-point hitch or any other suitable attachment mechanisms known to a person skilled in the art. For purposes of illustration, only the components of the system that are significant to the description of operation for berry picking and sorting are shown. However, it will be understood that other standard electrical and mechanical components will be included. For example, the system may include a generator and/or batteries for powering the electrical components.

In the example of FIG. 1, the harvesting system 100 is positioned over two spaced beds 101 of plants 103 (e.g., strawberry plants) that are located in a field. The beds 101 are elevated with respect to a ground of the field such that each bed 101 has a top surface 105 and two opposing side surfaces 107. As illustrated, the plants 103 are arranged in two spaced seed lines 109 along the top surface 105 of each bed 101. The plants 103 include stems 111, leaves 113 that line the stems 111, and strawberries 115 that extend from tips of the stems 111 (shown in FIG. 2). In some examples, some of the stems 111 may hang over the side surfaces 107 of the beds 101.

In the example of FIG. 1 (e.g., where the harvesting system 100 is positioned in a field of strawberries), the beds 101 have a height of about 20 cm to about 50 cm (e.g., 38 cm), a top width (e.g., as measured along the top surfaces 105 of the beds 101) of about 60 cm to about 90 cm (e.g., 76 cm), and a base width (e.g., as measured along the ground of the field) of about 80 cm to about 110 cm (e.g., 94 cm). In some examples, the beds 101 are spaced apart (e.g., as measured between respective centerlines of the beds 101) by about 115 cm to about 145 cm (e.g., 132 cm). In some examples, the seed lines 109 are spaced apart by about 30 cm to about 60 cm (e.g., 43 cm) along the beds 101. In some examples, the plants 103 arranged along a seed line 109 are spaced part by about 20 cm to about 50 cm (e.g., 38 cm). Accordingly, the harvesting system 100 may be configured to operate on the beds 101 of plants 103.

The harvesting system 100 includes a frame 102 supported by four wheels 104 that transport the harvesting system 100 in a direction of travel 121, frontal platforms 106 and a rear platform 108 extending across lower portions of the frame 102, two electrical enclosures 110 mounted to an upper portion of the frame 102, and a cover 112 extending from the upper portion of the frame 102. The cover 112 may support lighting devices for illuminating portions of the harvesting system 100 and portions of the surrounding field (e.g., during low light conditions). In some examples, the cover 112 may shield portions of the harvesting system 100 from sunlight and precipitation. Pallets 117 and containers 119 of strawberries 115 may be supported on the rear platform 108. The harvesting system 100 also includes two opposite facing chairs 114 (e.g., and associated monitors, not shown) where personnel can sit to visually inspect the strawberries 115 and package the strawberries 115 in the containers 119. The harvesting system 100 further includes a lower conveyor 116 that transports the harvested strawberries 115 upward towards the operators for placement into the containers 119 and an upper conveyor 118 that transports the containers 119 rearward for stacking on the pallets 117. A foreman will supervise the personnel, steer the harvesting system 100, and monitor the operation of the harvesting system 100. Two individuals (e.g., residing on the rear platform 108) will palletize the containers 119 and prepare empty containers 119 for the personnel inspecting and packaging.

The harvesting system 100 is configured such that the wheels 104 are located along the outer side surfaces 107 of two spaced beds 101 of plants 103. The wheels 104 and suspension support the frame 102 (e.g., and any components mounted to the frame 102) of the harvesting system 100 at a desired height above the raised bed 101.

Figure 2:
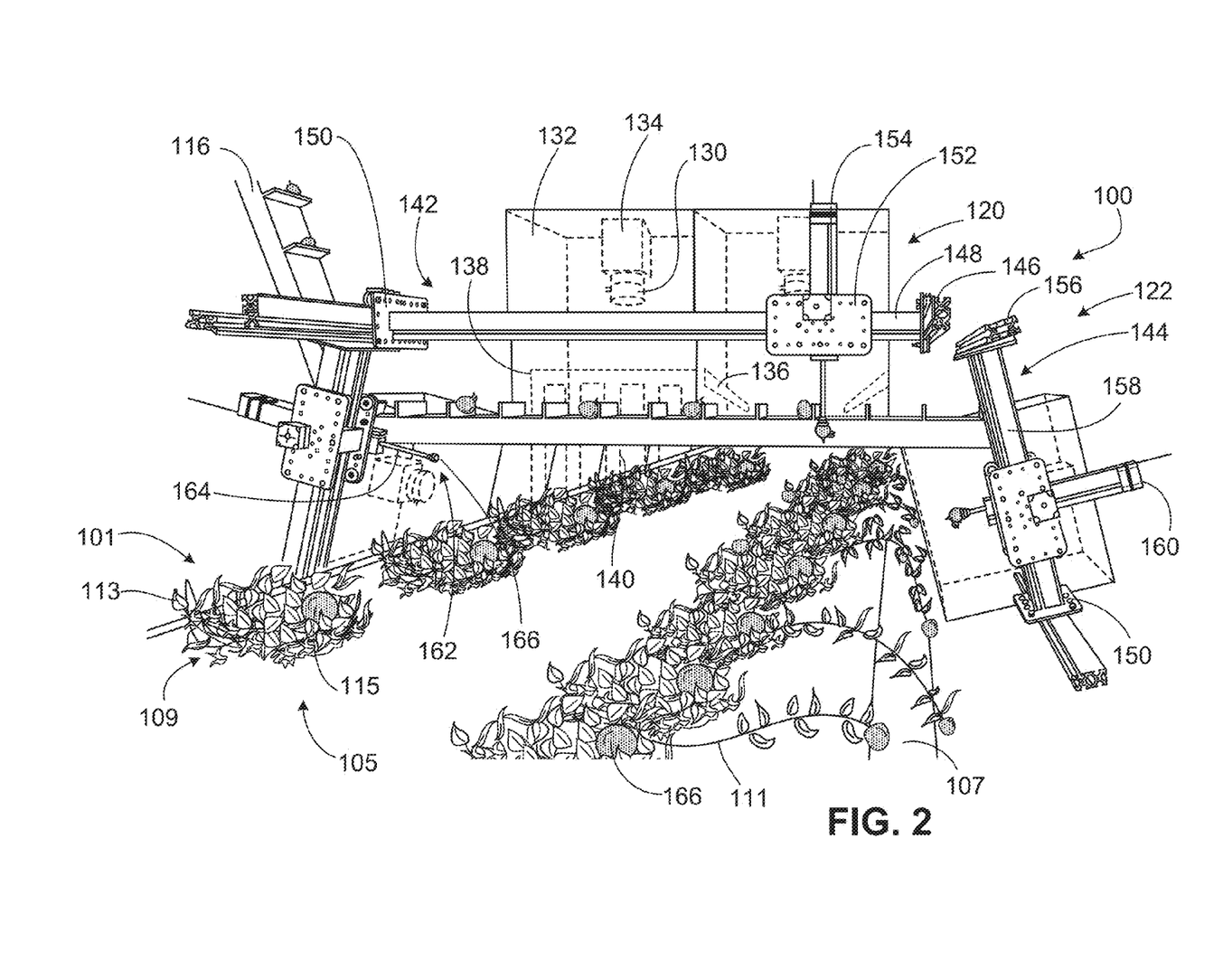
FIG. 2 is a rear perspective view of a portion of the harvesting system of FIG. 1.

Referring to FIG. 2, the portion of the harvesting system 100 that passes over each bed 101 includes two machine vision systems 120 that image the plants 103, that identify the strawberries 115 within the plants 103, and that select strawberries 115 to be removed from the plants 103. One machine vision system 120 is located along each bed 101 of plants. The harvesting system 100 also includes manipulating devices (e.g., air nozzles 136 and a flexible comb 138 shown in FIG. 2) for moving the plants 103 (e.g., the leaves 113 of the plants 103), two picking systems 122 that remove selected strawberries 115 from the plants 103, and a programmable logic controller (PLC) 124 that is located within one of the electrical enclosures 110 and electrically coupled to the machine vision systems 120.

Referring back to FIG. 1, the harvesting system 100 additionally includes an encoder 126 that is operable to detect an angular velocity of the wheels 104 and an ultrasonic sensor 128 that is operable to detect a distance and maintain a desired distance between the machine vision systems 120 (e.g., cameras 130 of the machine vision systems 120) and the top surfaces 105 of the beds 101. For example, the machine vision systems 120 and the picking systems 122 are supported by frames (e.g., frames that are adjustable via associated actuators and that are moveably attached to the frame 102) that are adjusted automatically in vertical and lateral directions to optimize their positions relative to the beds 101. The encoder 126 is located within a hub of one of the wheels 104, and the ultrasonic sensor 128 is located forward of the machine vision systems 120 along the frame 102 of the harvesting system 100. A GPS system (e.g., located within one of the electrical enclosures 110) provides a field location to the PLC 124.

As shown in FIG. 2, each machine vision system 120 includes four cameras 130 (e.g., one camera 130 located above each seed line 109 and one camera 130 located along each side surface 107 of the bed 101). The machine vision system 120 further includes four hoods 132 that respectively surround the cameras 130. The cameras 130 are oriented and positioned to image respective fields of view along the top surface 105 and along the side surfaces 107 of the bed 101 of plants 103. Accordingly, each camera 130 and respective hood 132 is oriented approximately perpendicular to the top surface 105 or a respective side surface 107 of the bed 101 of plants 103. In some examples, the cameras 130 are spaced (e.g., as measured from lenses of the cameras 130) from the top surface 105 or a respective side surface 107 of the bed 101 of plants 103 by about 30 cm to about 80 cm (e.g., 76 cm). In some examples, a distance between the lateral cameras 130 and the side surfaces 107 of the bed 101 is smaller than a distance between the upper cameras 130 and the top surface 105 of the bed 101. The hoods 132 are adapted to block (e.g., reduce the amount of) natural light, which varies depending on a season, weather, and a time of day, that would otherwise impinge upon the plants 103 in the fields of view.

One or more LEDs are located on each side of each camera 130. The LEDs have filters for sufficient illumination and desired image characteristics. The cameras 130 may be standard resolution, color video graphics array (VGA) cameras known to a person skilled in the art. For example, the cameras 130 may have a pixel count of 480×640 and image a 35 cm×45 cm field of view. The camera resolution (e.g., pixel dimension) of such a field of view may be 0.075 cm, which is adequate for identifying individual stems 111, leaves 113, and strawberries 115 of the plants 103. The cameras 130 can acquire images every 200 ms, allowing the cameras 130 to acquire three images of a same region of a plant 103 while the harvesting system 100 moves at a predetermined speed (e.g., about 10 cm/s).

Figure 3A:
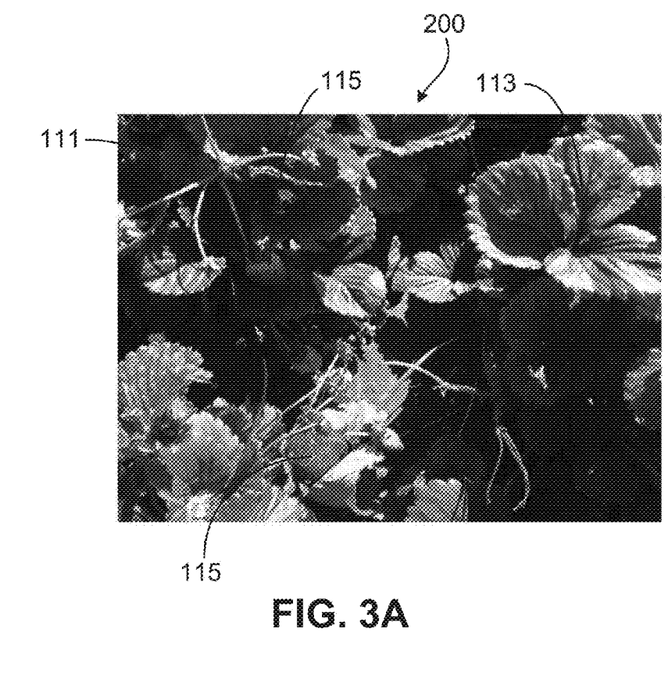
FIGS. 3A and 3B respectively display a standard image acquired by a camera of the harvesting system of FIG. 1 and a machine vision view generated by a processor of the camera.
Figure 3B:
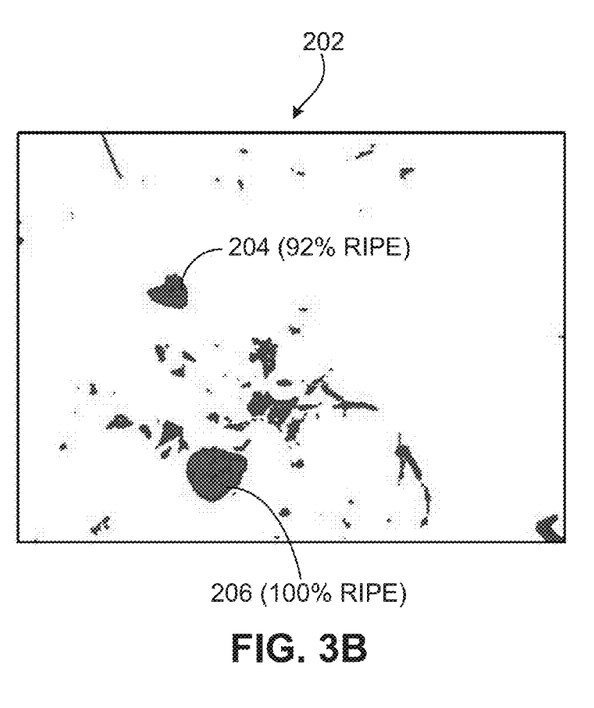

FIGS. 3A and 3B display an image 200 acquired by a camera 130, and a corresponding machine vision view 202 generated by a respective processor 134 of the camera 130, respectively. Following capture of the image 200 by the camera 130, the processor 134 performs a blob analysis on the image 200 to generate the machine vision view 202. That is, the processor 134 performs a mathematical analysis that finds regions in the image 200 that share the same one or more properties (e.g., the same one or more colors) and combines the regions into blobs. In particular, the regions of interest exhibit a range of red colors that meet a ripe color criterion (e.g., a ripe color threshold or ripe color range) for a strawberry 115 and a range of white colors (shown as blue in the machine vision view 202) that meet an unripe color criterion (e.g., an unripe color threshold or an unripe color range) for a strawberry 115. Accordingly, the processor 134 finds pixels in the image 200 that meet the ripe color criterion and pixels in the image 200 that meet the unripe color criterion.

The processor 134 then combines the pixels meeting the ripe and unripe color criteria (e.g., pixels that are adjacent or sufficiently close to each other) into a blob (e.g., as illustrated by the blobs 204, 206) and draws a border around the blob, thereby defining a pattern (e.g., a shape) of the blob. The processor 134 further determines a size of the blob (e.g., a length and/or a width of the respective pattern). The processor 134 compares the pattern and size of the blob to known (e.g., stored) patterns and sizes of strawberries. In some examples, the known patterns and sizes may be associated with shapes and sizes of entire strawberries or portions of strawberries. Blobs that have patterns that sufficiently match known patterns of strawberries and that meet a minimum size threshold (e.g., a stored threshold value) for a strawberry are identified as strawberries 115. Blobs that have patterns that do not have recognizable features (e.g., recognizable shape profiles) or that do not meet the minimum size threshold for a strawberry are ignored by the processor 134 and left on the plant 103.

Once a blob is identified as a strawberry 115, the processor 134 determines a ripeness of the strawberry 115 by further analyzing the pixels that define the blob. In particular, a percentage ripeness (e.g., shown as 92% ripeness of the blob 204 and 100% ripeness of the blob 206) is calculated as a ratio of the area of the pixels meeting the ripe color criterion to the area of all of the pixels defining the blob. The processor 134 then identifies select strawberries 115 to be harvested from the plant 103 as strawberries 115 having a ripeness that meets a ripeness threshold (e.g., typically a stored ripeness threshold value of 85%).

The processor 134 runs an algorithm to determine digital image position coordinates of each selected strawberry 115 (e.g., xy position coordinates of centroids of the respective blobs in a digital coordinate system of the digital image). The processor 134 further determines an orientation of each selected strawberry 115 (e.g., defined as an angle of a major axis of the respective blob relative to an x axis or y axis extending through the digital image position coordinates of the blob). In some examples, the orientation of a selected strawberry 115 may be determined according to an orientation of a blob (e.g., corresponding to a stem attachment region) that is adjacent to the blob associated with the selected strawberry 115. For example, a stem attachment region (e.g., a portion of a stem 111 located at the top of a strawberry 115) may be identified by a separate color and pattern-based blob analysis. The processor 134 then provides the digital image position coordinates, the orientations of the selected strawberries 115, and the machine vision views to the PLC 124. The processor 134 performs the analysis on each image (e.g., the image 200) once the image is acquired and subsequently provides the resultant information to the PLC 124 in a continuous manner.

Using the above-described blob analysis, the harvesting system 100 can quickly process large amounts of information to recognize patterns, determine ripenesses, determine centroid locations, and determine orientations to locate fruits and determine whether the fruits are ripe enough for picking. In contrast, conventional fruit picking systems using other types of analyses (e.g., spectral analyses) may, in some examples, only determine specific wavelengths of energy corresponding to respective regions in the images. As compared to such conventional analyses, the above-described blob analysis is more accurate, provides more information, and is more successful in correctly identifying strawberries.

The PLC 124 processes the digital image position coordinates, the orientations of the selected strawberries 115, and the machine vision views (e.g., such as the machine vision view 202) to generate a virtual Cartesian coordinate system (e.g., an xy coordinate system) that is located relative to the lens plane of the camera 130 and that accounts for the motion of the harvesting system 100. In a continuous manner, the PLC 124 compiles the information associated with three consecutive machine vision views (e.g., such as the machine vision view 202) at a time and determines a position of each selected strawberry 115 in the virtual coordinate system (e.g., the position of the strawberry 115 relative to a picking device 162 of the picking system 122, shown in FIG. 2), a ripeness of the selected strawberry 115, and an orientation of the selected strawberry 115. The position, ripeness, and orientation of the strawberry 115 may be calculated as an average position, an average ripeness, and an average orientation based on respective positions, ripenesses, and orientations associated with each of the three consecutive machine vision views. The PLC 124 may then provide instructions for controlling the picking system 122 to pick the selected strawberry 115 based on the position of the selected strawberry 115 in the virtual coordinate system.

Figure 4A:
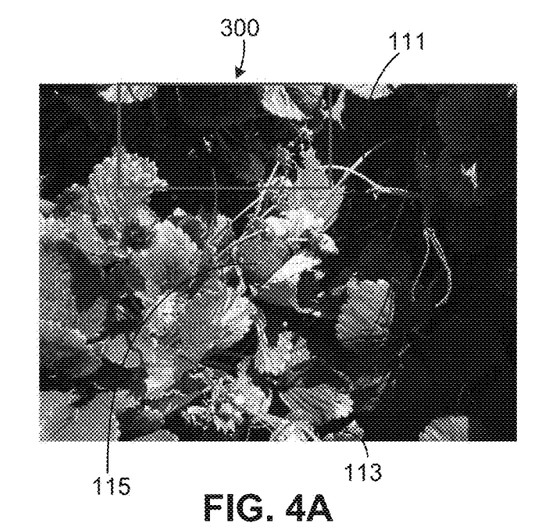
FIGS. 4A, 4B, and 4C respectively display a standard image acquired by a camera of the harvesting system of FIG. 1, an enhanced image produced by a processor of the camera, and a machine vision view generated by the processor of the camera.
Figure 4B:
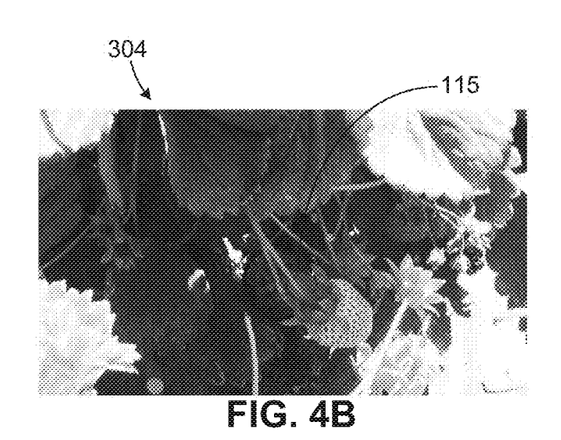
Figure 4C:
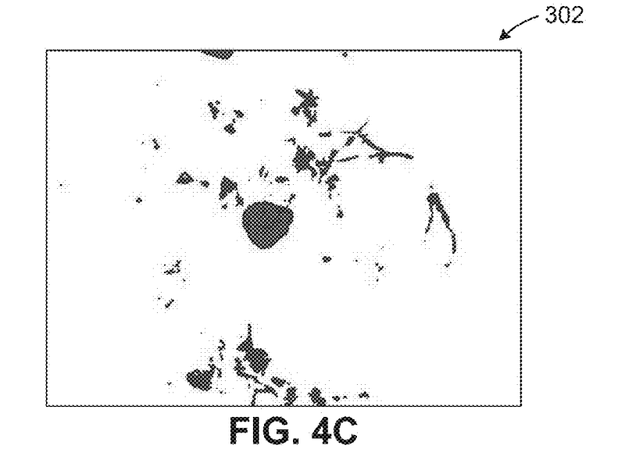

FIGS. 4A-4C show an image 300 acquired by the camera 130, an enhanced image 304 produced by the processor 134, and a machine vision view 302 generated by the processor 134, respectively. In some examples, the processor 134 varies the Red Green Blue (RGB) data of the pixels (e.g., such that the Red level is greater than twice the Green level and such that the Red level is twice the Blue level) in the image 300 prior to performing the blob analysis, in order to brighten the image 300, to enhance the pixel colors in the image 300, and/or to increase contrast among the colors in the image 300, thereby producing the enhanced image 304 (displaying a portion of the image 300 provided in the rectangular outline). Such processing can improve the detection of strawberries 115 in dim light (e.g., at night or when the strawberry 115 is shadowed by leaves 113, stems 111, or other plant material) or in cases where the coloration of the strawberries 115 is affected by moisture or other environmental contaminants.

Referring again to FIG. 2, the harvesting system 100 includes plant manipulation devices that may be used to move the stems 111, leaves 113, and other plant materials from side to side in order to expose hidden strawberries 115 to the respective camera 130. According to an actuation rate of the manipulation devices and the image acquisition rate (e.g., 5 fps) of the camera 130, at least one of the three images showing a particular region of the plant 103 will capture a particular strawberry 115 in an exposed state. In one example, the manipulation devices are air nozzles 136 located on opposite sides of an internal surface of the hood 132. The air nozzles 136 can apply controlled bursts of air to the plants 103 in an alternating manner while the camera 130 acquires images of the plants 103. Accordingly, the alternating air bursts from the nozzles 136 on either side of the seed line 109 move the stems 111, leaves 113, and other plant materials from side to side to expose hidden strawberries 115.

In another example, the plant manipulation device is a flexible comb 138 that is mounted to the hood 132 at a location below the camera 130 and above the plants 103. The comb 138 has flexible finger-like projections 140 that extend down into the plants 103 and are moved back and forth across the plants 103 while the camera 130 acquires images of the plants 103. In this manner, the finger-like projections 140 move the stems 111, leaves 113, and other plant materials from side to side to expose hidden strawberries 115. While examples of each of these plant manipulation devices are shown in FIG. 2 for purposes of illustration, it will be understood that either or both of these devices may be provided to manipulate the plants along any given seed line 109.

Still referring to FIG. 2, the picking system 122 includes an upper movement frame 142 located above the bed 101 of plants 103 and two lateral movement frames 144 respectively spaced from the side surfaces 107 of the bed 101 of plants 103. The upper movement frame 142 includes two opposing horizontal rails 146 oriented parallel to a length of the bed 101 and a horizontal rail 148 oriented perpendicular to the length of the bed 101. The horizontal rail 148 extends between and is moveable along the horizontal rails 146 via opposing clamps 150. The upper movement frame 142 further includes a clamp block 152 that is moveable along the horizontal rail 148. The clamp block 152 carries a vertical rail 154 (e.g., oriented perpendicular to the top surface 105 of the bed 101) that is moveably secured to the clamp block 152. In this manner, the vertical rail 154 is moveable vertically with respect to the clamp block 152 and moveable horizontally along the horizontal rail 148. In some embodiments, the horizontal rails 146, 148 are positioned about 4 cm to about 12 cm (e.g., 8 cm) below the frame 102 of the harvesting system 100.

Each lateral movement frame 144 includes two rails 156 oriented parallel to the length of the bed 101 and a rail 158 extending between the two rails 156. The rail 158 is moveable along the rails 156 via opposing clamps 150. Each lateral movement frame 144 further includes a clamp block 152 that is moveable along the rail 158 and a rail 160 (e.g., oriented perpendicular to the side surface 107 of the bed 101) that is moveably secured to the clamp block 152. In this manner, the rail 160 is moveable perpendicularly with respect to the clamp block 152 and moveable axially along the rail 158. In some embodiments, the rails 156, 158 are positioned with respect to the frame 102 of the harvesting system 102 such that the rails 156, 158 are spaced about 10 cm to about 20 cm (e.g., 15 cm) from the side surfaces 107 of the beds 101 (e.g., as measured perpendicularly from the side surfaces 107 of the beds).

The picking system 122 further includes three picking devices 162 (e.g., robotic pickers) that are moveable by the upper movement frame 142 and by the lateral movement frames 144. In particular, an upper picking device 162 extends from the vertical rail 154 of the upper movement frame 142 and two lateral picking devices 162 respectively extend from each of the rails 160 of the lateral movement frames 144. The movement frames 142, 144 are positioned rearward of the machine vision systems 120 (e.g., rearward relative to the direction of travel 121 of the harvesting system 100). Accordingly, the picking devices 162 follow behind the cameras 130. For example, in some embodiments, the picking devices 162 are positioned about 40 cm to about 80 cm (e.g., about 60 cm) rearward of the cameras 130. Accordingly, the picking devices 162 are located outside of the fields of view of the cameras 130 and are guided to pick strawberries 115 that have been selected based on previously acquired images while the cameras 130 continue to acquire and process new images.

According to control signals provided by the PLC 124 based on images previously acquired by the respective camera 130, the horizontal rail 148 can be moved along the horizontal rails 146 to move (e.g., translate) the upper picking device 162 along or opposed to the direction of travel 121 of the harvesting system 100, and the respective clamp block 152 can be moved along the horizontal rail 148 to move (e.g., translate) the upper picking device 162 along a direction that is transverse to the direction of travel 121. In this manner, the horizontal rail 148 and the clamp block 152 can be controlled to move the upper picking device 162 along the top surface 105 of the bed 101 in each of the x and y directions of the virtual coordinate system in the lens plane of the respective camera 130. Similarly, according to control signals provided by the PLC 124 based on the images previously acquired by the camera 130, the vertical rail 154 can be controllably moved with respect to the clamp block 152, to move (e.g., translate) the upper picking device 162 perpendicularly with respect to the top surface 105 of the bed 101. In this manner, the upper picking device 162 can be moved toward or away from the top surface 105 of the bed 101 in a direction (e.g., a z direction) that is perpendicular to the x and y directions of the digital coordinate system located in the lens plane of the camera 130 to pick a strawberry 115 selected based on the previously acquired images.

According to control signals provided by the PLC 124 based on images previously acquired by the respective camera 130, the rails 158 can be moved along the rails 156 to move (e.g., translate) the lateral picking devices 162 along the side surfaces 107 of the beds 101, and the respective clamp blocks 152 can be moved along the rails 158 to adjust a height of the lateral picking devices 162. In this manner, the rails 158 and the clamp blocks 152 can be controlled to move the lateral picking devices 162 along the side surfaces 107 of the beds 101 in each of two orthogonal directions of the lens plane of the respective camera 130. Similarly, according to control signals provided by the PLC 124 based on the images previously acquired by the camera 130, the rails 160 can be controllably moved with respect to the clamp block 152 to move (e.g., translate) the lateral picking devices 162 perpendicularly with respect to the side surfaces 107 of the bed 101. In this manner, the lateral picking devices 162 can be moved toward or away from the side surfaces 107 of the bed 101 in a direction (e.g., a z direction) that is perpendicular to the x and y directions of the digital coordinate system located in the lens plane of the camera 130 to pick a strawberry 115 selected based on the previously acquired images. In some examples, the rails 148, 154, 158, 160, and the clamp blocks 152 may be moved at speeds between about 1 cm/s and about 60 cm/s to translate the picking devices 162.

Each of the picking devices 162 includes an extension member 164 that projects from a respective rail 158, 160 and a grasping member 166 located at an end of the extension member 164. Each of the picking devices 162 includes a proximity sensor (e.g., a laser sensor) and a color sensor (e.g., a laser sensor) that are located within the grasping member 166. The proximity sensor (e.g., such as a proximity sensor 168 shown in FIGS. 5 and 6B) is responsive to distance between the picking device 162 and an object (e.g., a strawberry 115 selected by the processor 134 of the respective camera 130). Once a picking device 162 is positioned according to the xy position coordinates of the selected strawberry 115, the picking device 162 is moved towards (e.g., in the z direction with respect to the virtual coordinate system) the selected strawberry 115 until the proximity sensor is within a predetermined distance of (in some cases, in contact with) an object.

The color sensor within the grasping member 166 analyzes reflected light after stimulation of an object with a laser beam to indicate the color of the object. Based on a signal from the color sensor (e.g., such as a color sensor 170 shown in FIGS. 5 and 6B), the PLC 124 confirms whether the sensed object is of the color of the desired fruit (e.g., a red strawberry 115 as opposed to a green leaf 113). Upon determining that the sensed object proximate the grasping member 166 is a strawberry 115, then the picking device 162 is actuated by a servo actuator to gently grasp the selected strawberry 115 and to pull the strawberry 115 from its stem 113. Action of the grasping member 166 is controlled to minimize damage (e.g., bruising) of the strawberry 115.

Figure 5:
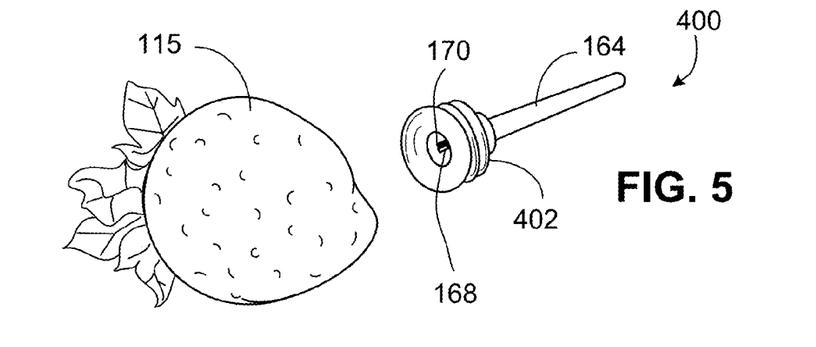
FIG. 5 is a perspective view of an embodiment of a picking device of the harvesting system of FIG. 1.

FIG. 5 illustrates one example of the picking device, in the form of a suction picker 400 that utilizes suction (e.g., a vacuum pressure) to attach itself to a strawberry 115 and pull the strawberry 115 from its stem. The suction picker 400 includes the extension member 164, a suction head 402 secured to the end of the extension member 164, a proximity sensor 168 located within the suction head 402, and a color sensor 170 located within the suction head 402.

Figure 6A:
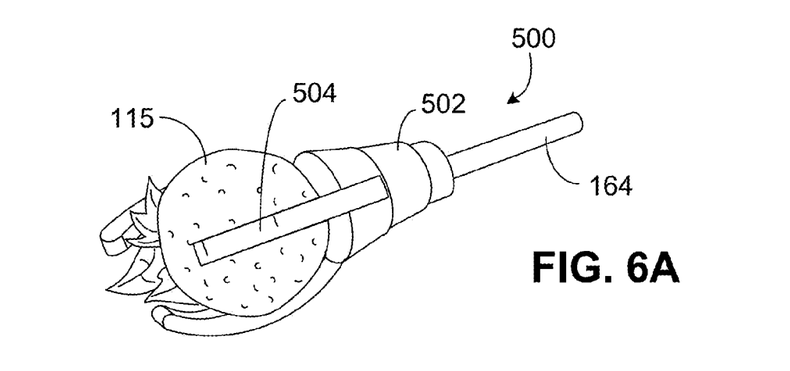
FIGS. 6A and 6B are perspective views of an embodiment of a picking device of the harvesting system of FIG. 1, shown in closed and open states, respectively.
Figure 6B:
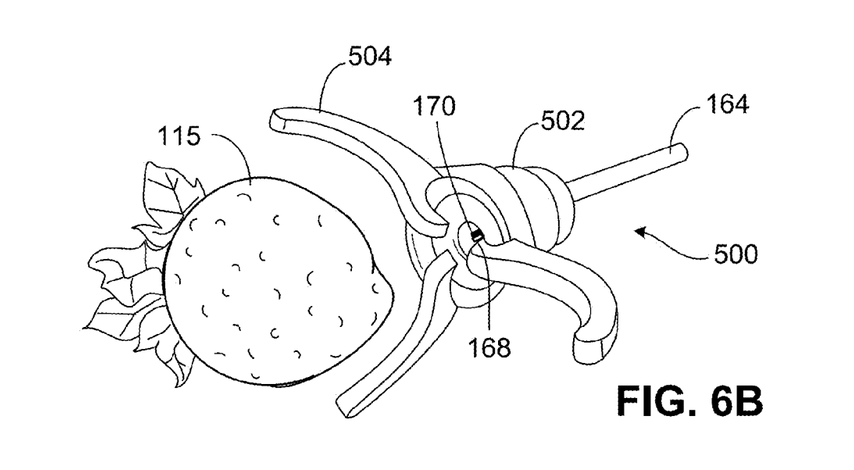

FIGS. 6A and 6B show another example of the picking device, in the form of a talon picker 500 that utilizes actuatable fingers 504 to grasp a strawberry 115 and pull the strawberry 115 from its stem. The talon picker 500 includes the extension member 164, a grasping head 502 secured to the end of the extension member 164 and supporting the fingers 504, the proximity sensor 168 located within the grasping head 502, and the color sensor 170 located within the grasping head 502. The talon picker 500 is advanced towards the strawberry 115 while the fingers 504 are in an open state, as shown in FIG. 6B. Upon contact of the strawberry 115 with the grasping head 502, the fingers 504 are closed to snuggly grasp the strawberry 115 without damaging the strawberry 115, as shown in FIG. 6A. In an alternative embodiment, a picking system may include a talon picker that has multiple fingers that, in a closed state, provide an internal diameter that is larger than a largest expected diameter of a strawberry 115. Such a large internal diameter allows a strawberry 115 to freely rotate within the closed fingers so that when the picker is lifted, the stem 111 of the strawberry 115 is pulled towards the bottom of the closed finger configuration, providing a severance location for the strawberry 115.

In operation, the harvesting system may be steered by an operator as it travels along the beds of plants. As the harvesting system travels in the field, communication is maintained over a network between the operator, the PLC, the wheel encoder (e.g., to indicate a distance traveled by the harvesting system), and the GPS system so that a status of the harvesting system can be monitored. Example monitored parameters include a system location, a velocity (e.g., determined according to the angular velocity of the wheels), a number of strawberries that have been harvested, a strawberry picking rate, locations from which the strawberries have been harvested, percentage ripenesses of the strawberries, and a size range of the strawberries. The operator may change the location and/or the velocity of the harvesting system by sending appropriate instructions over the network to the PLC of the harvesting system.

Figure 7:
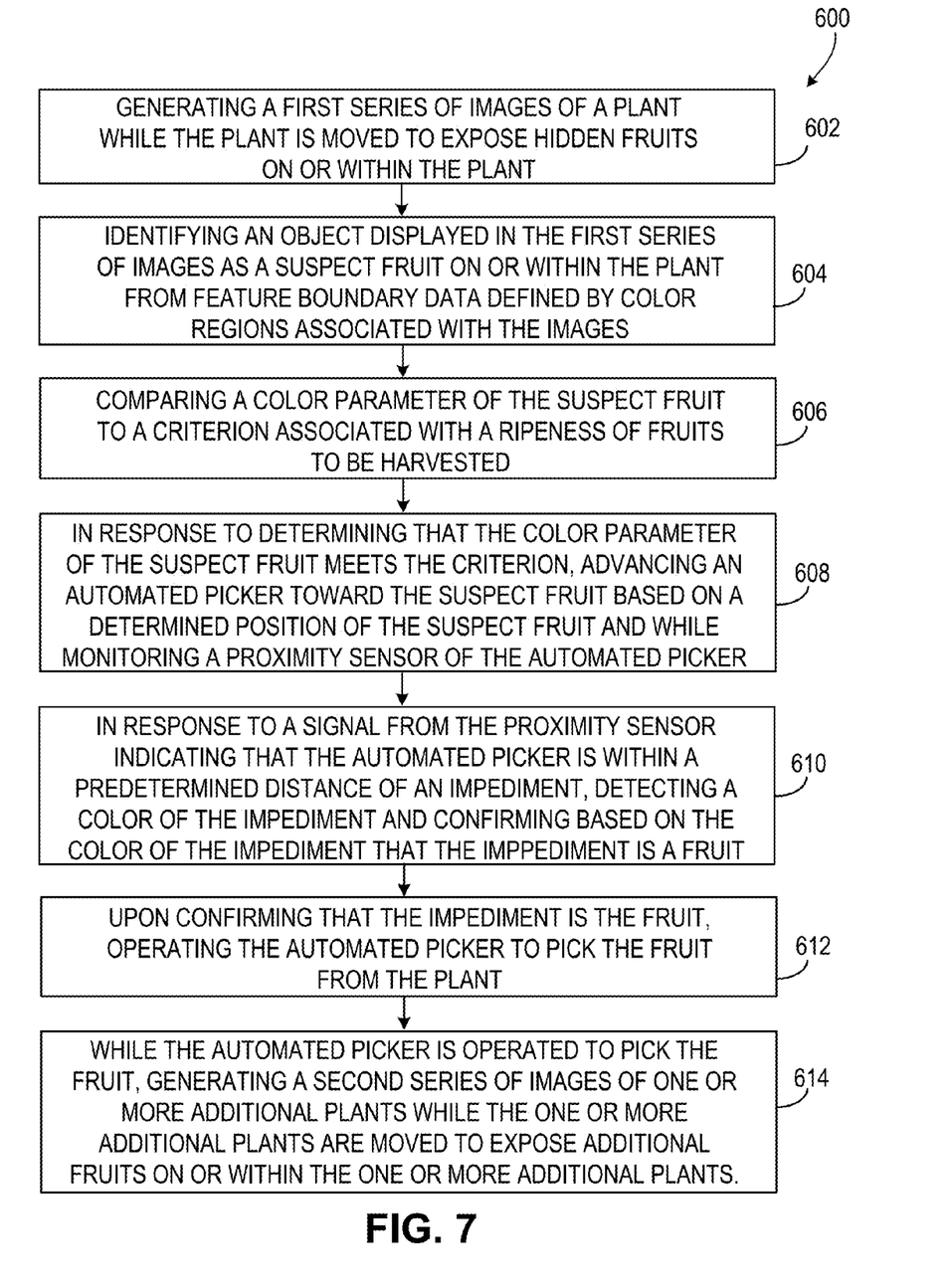
FIG. 7 is a flow chart of an example process for harvesting fruits.

FIG. 7 displays a flow chart of an example process 600 for selectively harvest fruits (e.g., strawberries) planted along beds of plants using the above-described harvesting system. As the harvesting system travels along the beds, each of the cameras generates (e.g., acquires) a series of images of a particular plant while the plant itself is moved to expose hidden strawberries on or within the plant (602). In some examples, the camera generates images at a rate of 5 fps, allowing the camera to generate three images of a same region of the plant while the harvesting system moves at a predetermined speed (e.g., about 10 cm/s). While the camera generates the series of images, one or more manipulating devices (e.g., one or more air nozzles and/or flexible combs) are actuated to move stems and leaves of the plant from side to side to expose hidden strawberries to the cameras.

The respective processor then identifies an object displayed within the series of images as a strawberry on or within the plant from feature boundary data defined by color regions associated with the images (604). For example, the processor may perform a blob analysis on the images by combining pixels that are adjacent or sufficiently close to each other and meeting a ripe color (e.g., red) criterion and an unripe color (e.g., white) criterion into a blob. The processor then determines a border around the blob, thereby defining a pattern (e.g., a shape) of the blob. The processor also determines a size of the blob. The processor then compares the pattern and size of the blob to known patterns and sizes of strawberries. A blob that has a pattern that sufficiently matches a known pattern of strawberries and that meets a minimum size threshold for a strawberry is identified as a fruit (e.g., a strawberry).

The processor compares a color parameter of the strawberry to a criterion associated with a ripeness of a strawberry to be harvested (606). For example, a percentage ripeness may be calculated as a ratio of the area of the pixels meeting the ripe color criterion to the area of all of the pixels defining the blob.

In response to determining that the color parameter of the strawberry meets a desired criterion (e.g., from comparing the percentage ripeness to a ripeness threshold), an automated picker is advanced toward the strawberry based on a determined position of the strawberry and while monitoring a proximity sensor of the automated picker (608). For example, when the percentage ripeness meets or exceeds a ripeness threshold, the processor identifies the strawberry as a selected strawberry to be harvested from the plant and provides the digital position coordinates of the selected strawberry, the orientation of the selected strawberry, and three machine vision views of the images to the PLC. Additionally, the encoder provides the angular speed of the wheels to the PLC.

The PLC then combines the three machine vision views into a single machine vision view that extends along the direction of the bed to determine the xy position (e.g., average position) and orientation (e.g., average orientation) of the selected strawberry in the virtual xy coordinate system generated by the PLC. For example, accounting for the angular speed of the wheels, the PLC calculates the xy position of the selected strawberry with respect to the respective picking device and sends commands to a motion controller accordingly. The motion controller then controls servomotors that move the appropriate rails, clamps and clamp blocks of the respective movement frame to align the picking device with the xy position of the selected strawberry. The picking device is then advanced towards the selected strawberry (e.g., along the z direction).

In response to a signal from the proximity sensor indicating that the automated picker is within a predetermined distance of an impediment, the automated picker detects a color of the impediment and confirms based on the color of the impediment that the impediment is a strawberry (610). In some examples, the picking device detects the color of the impediment upon contact of the impediment with the picking device (e.g., at a predetermined distance of zero). Upon confirming that the impediment is the strawberry, the automated picker is operated to pick the strawberry from the plant (612). For example, if the picking device confirms that the proximate object is a strawberry (e.g., based on a sensed color of the object), then the picking device is actuated to grasp and pull the selected strawberry from the plant. In some examples, the picking device may grasp the selected strawberry at a particular position based on an orientation of a stem attachment region determined by the processor.

The PLC then sends commands to the motion controller to move the picking device towards the lower conveyor of the harvester and to deposit (e.g., release) the strawberry atop an open space along the lower conveyor. The lower conveyor transports the strawberry, as well as previously deposited strawberries, upward towards the operators and the upper conveyor. The operators examine the strawberry, and if the strawberry passes the examination, then the operators place the strawberry in the container. Once an operator determines that the container is sufficiently filled with strawberries, the operator places the container on the upper conveyor for rearward transport. The upper conveyor transports the container rearwardly to an operator who deposits (e.g., stacks) the containers on the pallet supported by the rear platform of the harvesting system.

While the automated picker is operated to pick the strawberry, the camera continues to generate additional images of one or more additional plants (e.g., located ahead of the automated picker) as the one or more additional plants are moved to expose additional fruits on or within the one or more additional plants (614). Owing to the simultaneous actions of the cameras, the respective processors, and the respective picking devices, the harvesting system can achieve a strawberry picking rate as fast as one strawberry every 2 seconds, such that the harvesting system may harvest up to 30 strawberries per minute. In contrast, many conventional systems that harvest the strawberries only subsequent to completing image acquisition and processing achieve picking rates of up to about one berry every 5 seconds. Accordingly, the harvesting system may be used to harvest strawberries in a much faster manner than some conventional automated harvesters, while avoiding significant fruit damage.

While the harvesting system 100 of FIG. 1 is illustrated and described as operating over particular raised beds 101 of plants 103, in harvesting other types of fruits (e.g., citrus fruits, apples, peaches, pears, or other types of berries, such as blueberries, raspberries, blackberries), the beds may be of different configurations and a harvesting system that is substantially similar in construction and function to the harvesting system 100 may be configured accordingly. Furthermore, while the harvesting system 100 is illustrated and described as operating over two spaced beds 101 of strawberry plants 103, in other embodiments, a harvesting system that is substantially similar in construction and function to the harvesting system 100 can be configured to operate on more than two beds of strawberry plants (e.g., four or six beds of strawberry plants).

While the harvesting system 100 has been described and illustrated as including one machine vision system 120 and one picking system 122 per bed 101 of plants 103, other examples may include a different number machine vision systems and picking devices. Furthermore, a harvesting system may include a different number of cameras 130 (e.g., per machine vision system 120) and picking devices 162 (e.g., per picking system 122).

While the picking system 122 of the harvesting system 100 has been described as operating via a three-axis (e.g., xyz) movement system (e.g., provided by the upper and lateral movement frames 142, 144) providing three degrees of freedom, in some embodiments, a picking system of a substantially similar harvesting system may operate via a movement system that provides additional degrees of freedom. For example, in some embodiments, a picking system may operate via a six-axis system that provides for both translation and rotation about each of the x, y, and z axes, thereby providing six degrees of freedom. In further embodiments, one or two additional degrees of freedom (e.g., translation and/or rotation) may be provided at a distal end of a picking device of the three-axis system or the six-axis system, thereby providing a four, five, seven, or eight-axis system that provides respective degrees of freedom.

Thus, while a number of examples have been described for illustration purposes, the foregoing description is not intended to limit the scope of the invention, which is defined by the scope of the appended claims. There are and will be other examples and modifications within the scope of the following claims.

What is claimed is:

1. A method of selectively harvesting fruits, the method comprising:
   generating a first series of images of a plant while the plant is moved to expose hidden fruits on or within the plant;
   identifying an object displayed in the first series of images as a suspect fruit on or within the plant from feature boundary data defined by color regions associated with the images;
   comparing a color parameter of the suspect fruit to a criterion associated with a ripeness of fruits to be harvested;
   in response to determining that the color parameter of the suspect fruit meets the criterion, advancing an automated picker toward the suspect fruit based on a determined position of the suspect fruit and while monitoring a proximity sensor of the automated picker;
   in response to a signal from the proximity sensor indicating that the automated picker is within a predetermined distance of an impediment, detecting a color of the impediment and confirming based on the color of the impediment that the impediment is a fruit;
   upon confirming that the impediment is the fruit, operating the automated picker to pick the fruit from the plant; and
   while the automated picker is operated to pick the fruit, generating a second series of images of one or more additional plants while the one or more additional plants are moved to expose additional fruits on or within the one or more additional plants.

2. The method of claim 1, wherein the first and second series of images are generated using a machine vision system comprising a camera that is directed toward the plant and a processor that is operable to analyze the images.

3. The method of claim 2, wherein the automated picker is located rearward of the machine vision system, such that the machine vision system generates the second series of images of the one or more additional plants while the automated picker is operated to pick the fruit.

4. The method of claim 2, further comprising maintaining a desired distance between the machine vision system and the plant.

5. The method of claim 1, further comprising adjusting Red Green Blue data of the first and second series of images to expose fruits hidden by shadows of leaves of the plant.

6. The method of claim 1, wherein identifying the object as a suspect fruit comprises identifying the object as a strawberry.

7. The method of claim 1, further comprising identifying the object as a suspect fruit using a pattern recognition algorithm.

8. The method of claim 7, wherein the pattern recognition algorithm comprises a blob analysis.

9. The method of claim 8, wherein the blob analysis identifies regions of the object that share one or more colors and determines a border around the regions that defines a pattern of the object.

10. The method of claim 9, wherein identifying the object as a suspect fruit comprises comparing the pattern of the object to a known pattern of the fruit.

11. The method of claim 9, wherein the pattern of the object comprises a shape of the object.

12. The method of claim 1, wherein comparing the color parameter of the fruit to the criterion comprises comparing a percentage ripeness of the fruit to a ripeness threshold.

13. The method of claim 1, wherein the predetermined position of the suspect fruit is a two-dimensional location.

14. The method of claim 13, further comprising, before advancing the automated picker toward the suspect fruit, aligning the automated picker with the two-dimensional location of the suspect fruit.

15. The method of claim 1, wherein the predetermined distance is a zero distance, such that the color of the impediment is detected in response to contact with the impediment.

16. The method of claim 1, wherein the automated picker comprises a suction picker.

17. The method of claim 1, wherein the automated picker comprises a talon picker.

18. The method of claim 1, further comprising moving the plant by blowing air toward the plant while the first series of images is generated.

19. The method of claim 1, further comprising moving the plant by brushing the plant from side to side with a flexible comb while the first series of images is generated.

20. A harvesting system, comprising:
a machine vision system that is configured to generate a first series images of a plant while the plant is moved to expose hidden fruits on or within the plant;
a processor that is configured to:
identify an object displayed in the first series of images as a suspect fruit on or within the plant from feature boundary data defined by color regions associated with the images,
compare a color parameter of the suspect fruit to a criterion associated with a ripeness of fruits to be harvested, and
determine that the color parameter of the suspect fruit meets the criterion;
an automated picker that is operable to pick the suspect fruit from the plant, the automated picker comprising:
a proximity sensor that is configured to indicate that the automated picker is within a predetermined distance of an impediment, and
a color sensor that is configured to detect a color of the impediment; and
a controller that is configured to provide instructions for:
advancing the automated picker toward the suspect fruit based on a determined position of the suspect fruit in response to the determination that the color parameter of the suspect fruit meets the criterion, while monitoring the proximity sensor of the automated picker, and while the machine vision system generates a second series of images of one or more additional plants while the one or more additional plants are moved to expose additional fruits on or within the one or more additional plants, and
confirming that the impediment is a fruit based on the color of the impediment.

* * * * *